Sept. 7, 1965              F. R. ROMANO              3,204,342

POLARIZED AND BI-REFRINGENT ANIMATED DISPLAY

Filed Jan. 24, 1962              12 Sheets-Sheet 1

INVENTOR.
FERDINAND R. ROMANO
BY
Lawrence S. Epstein
ATTORNEY

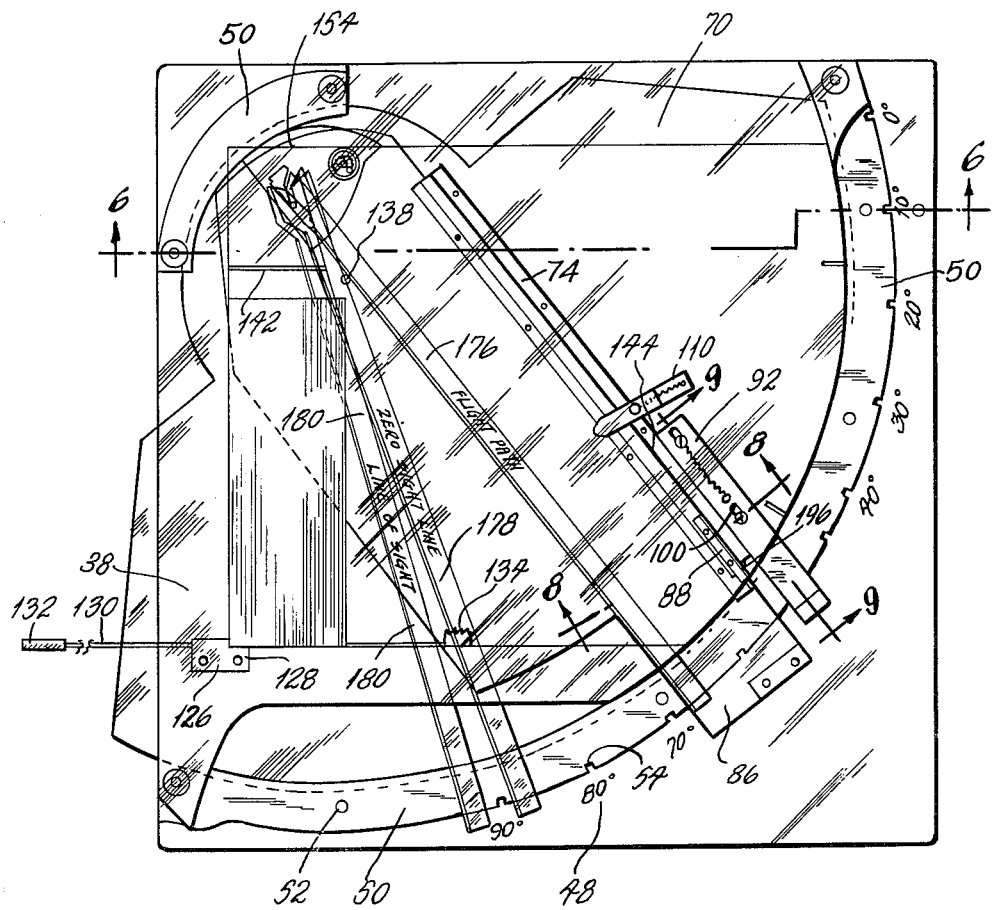

Sept. 7, 1965   F. R. ROMANO   3,204,342
POLARIZED AND BI-REFRINGENT ANIMATED DISPLAY
Filed Jan. 24, 1962   12 Sheets-Sheet 3

INVENTOR.
FERDINAND R. ROMANO
BY
Lawrence S. Epstein
ATTORNEY

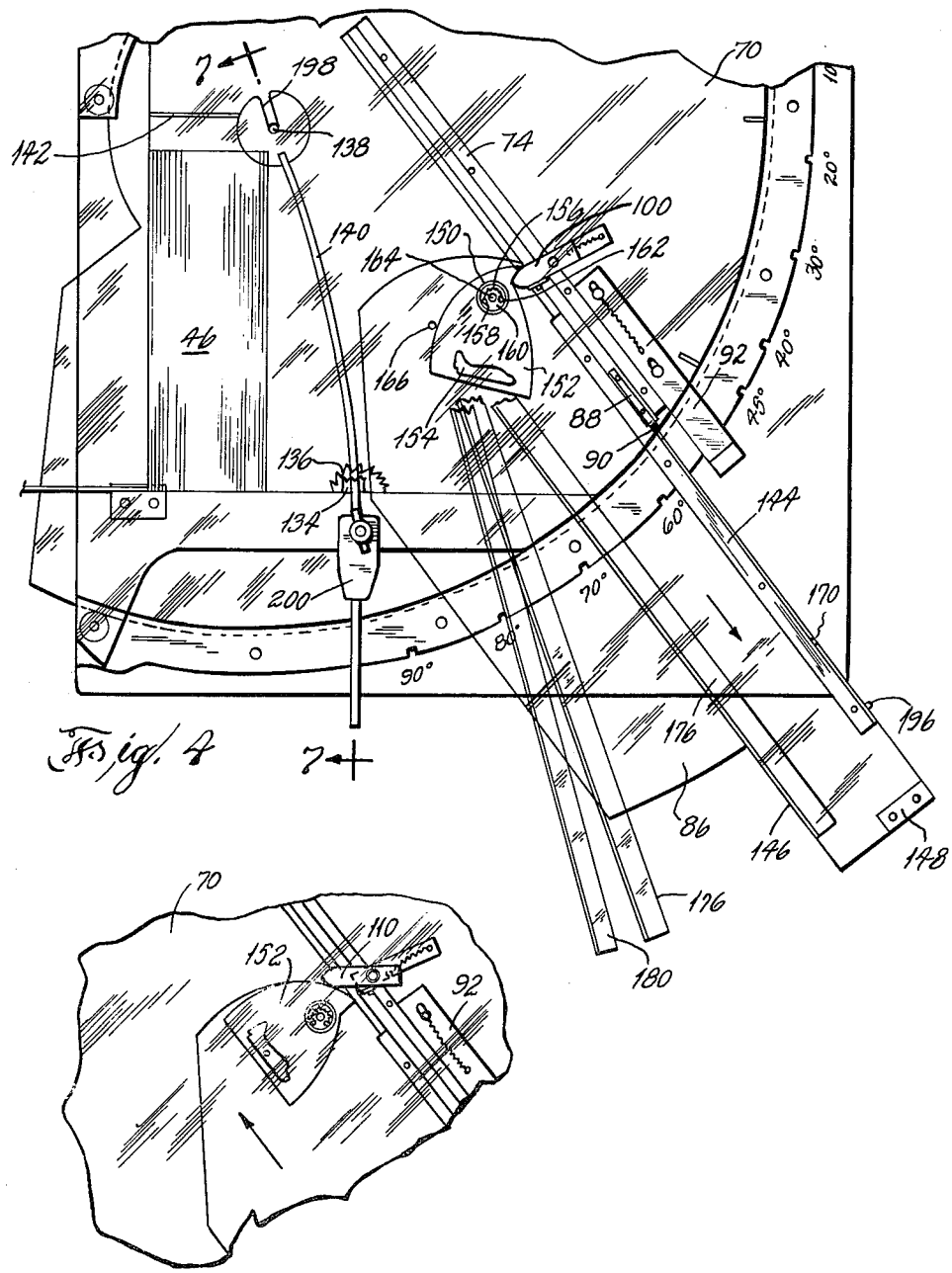

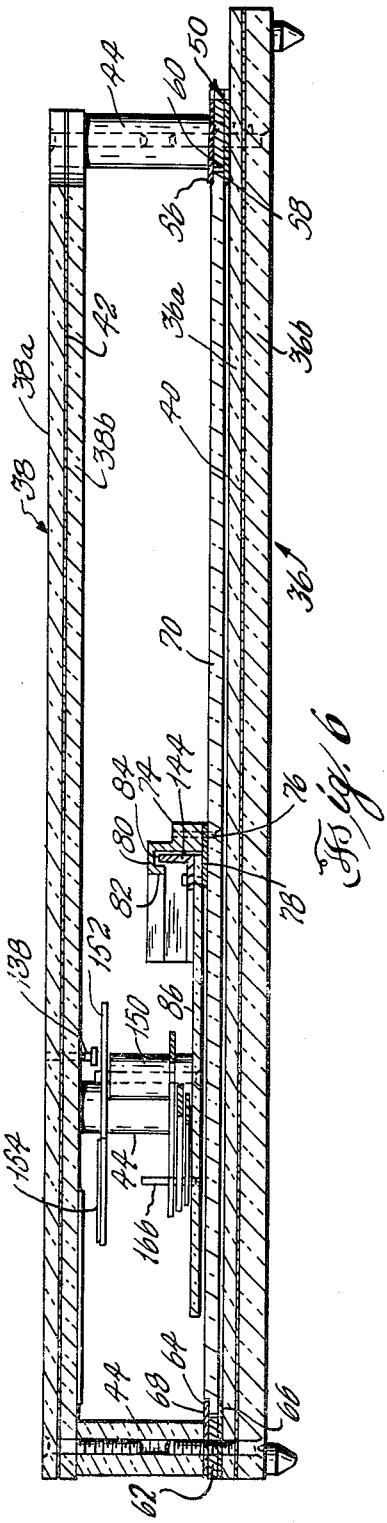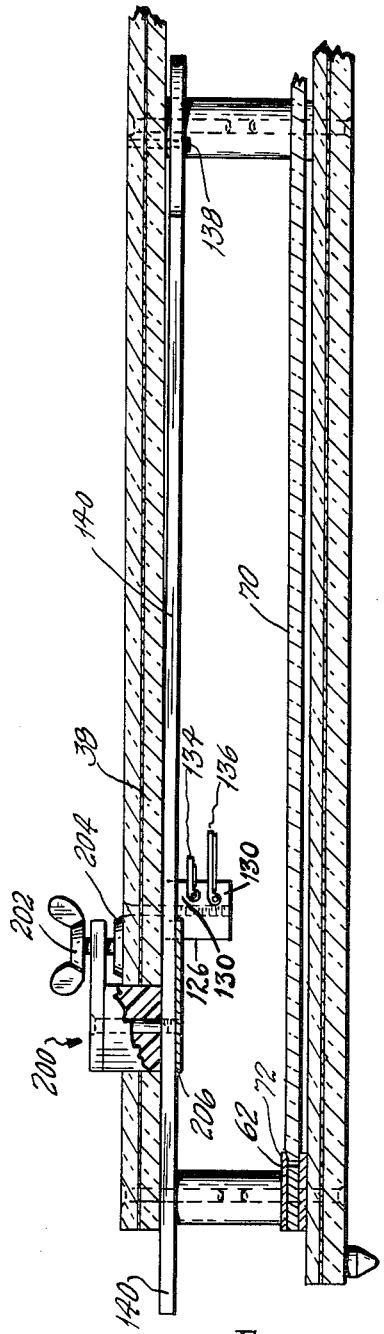

Sept. 7, 1965   F. R. ROMANO   3,204,342
POLARIZED AND BI-REFRINGENT ANIMATED DISPLAY
Filed Jan. 24, 1962   12 Sheets-Sheet 6
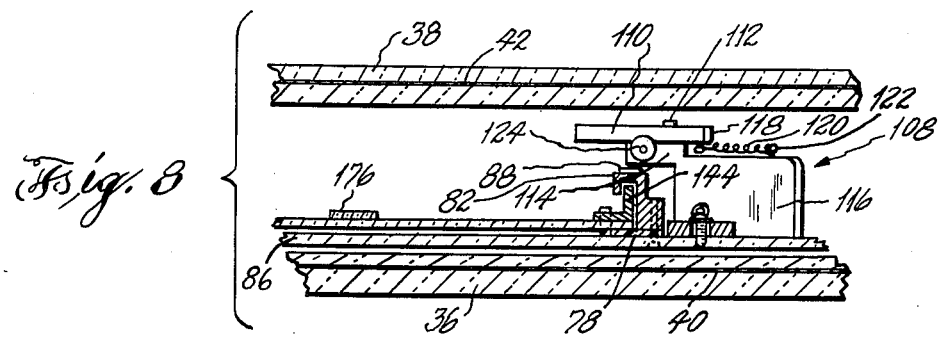
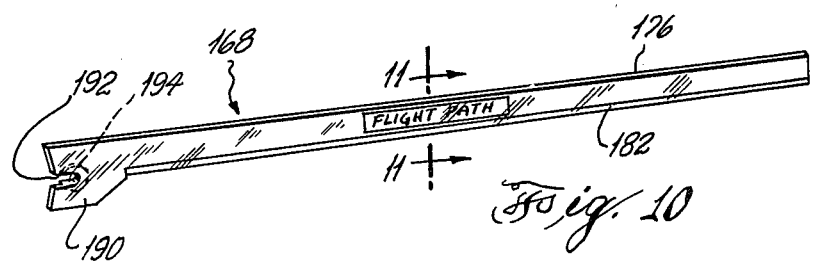
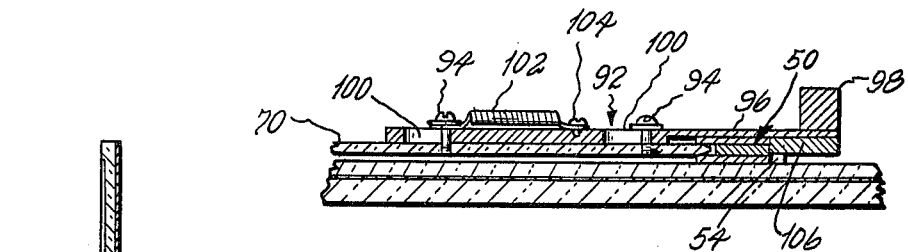
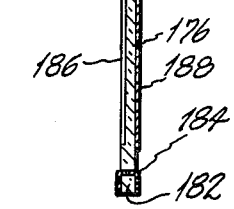
INVENTOR.
FERDINAND R. ROMANO
BY
Lawrence S. Epstein
ATTORNEY

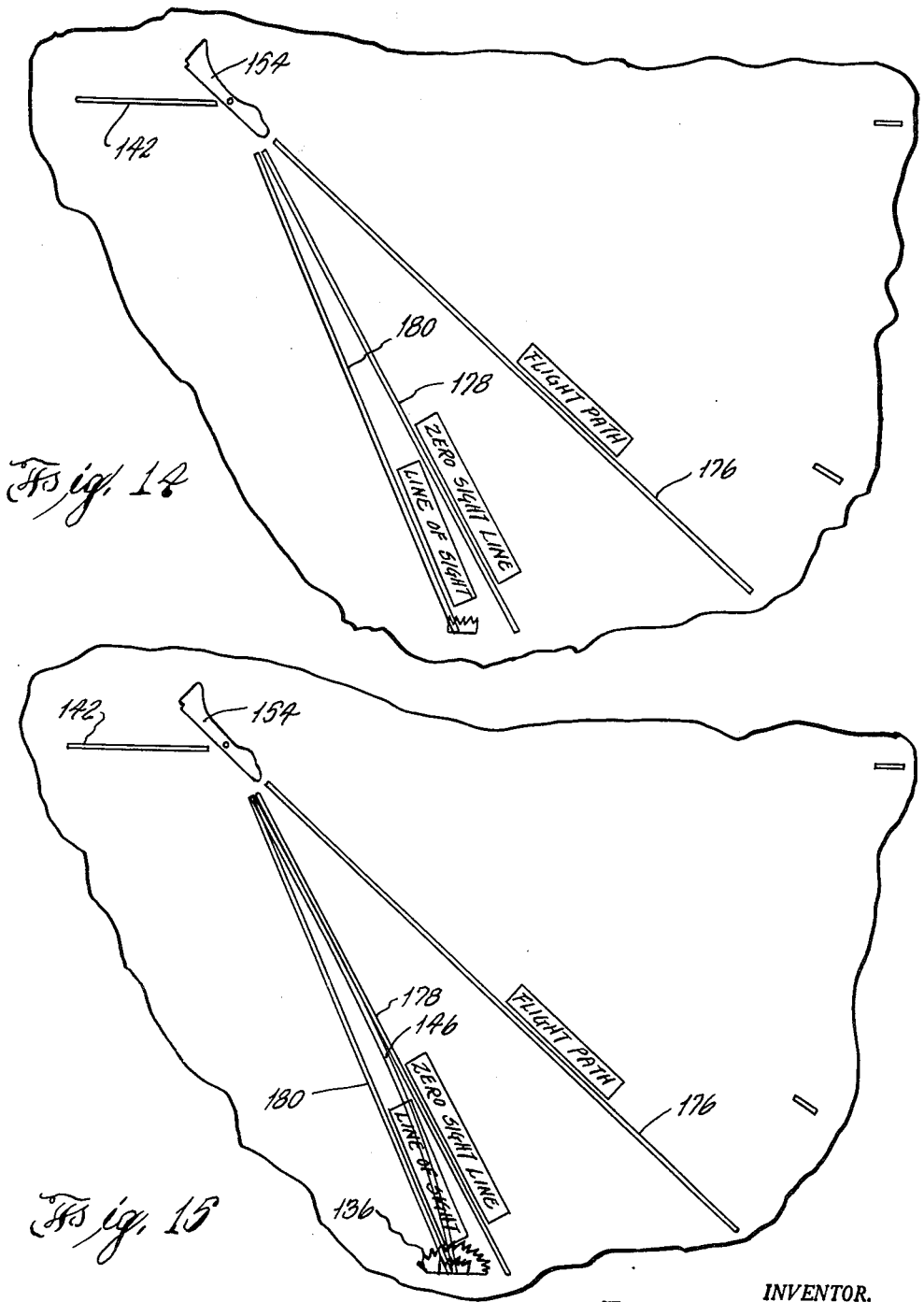

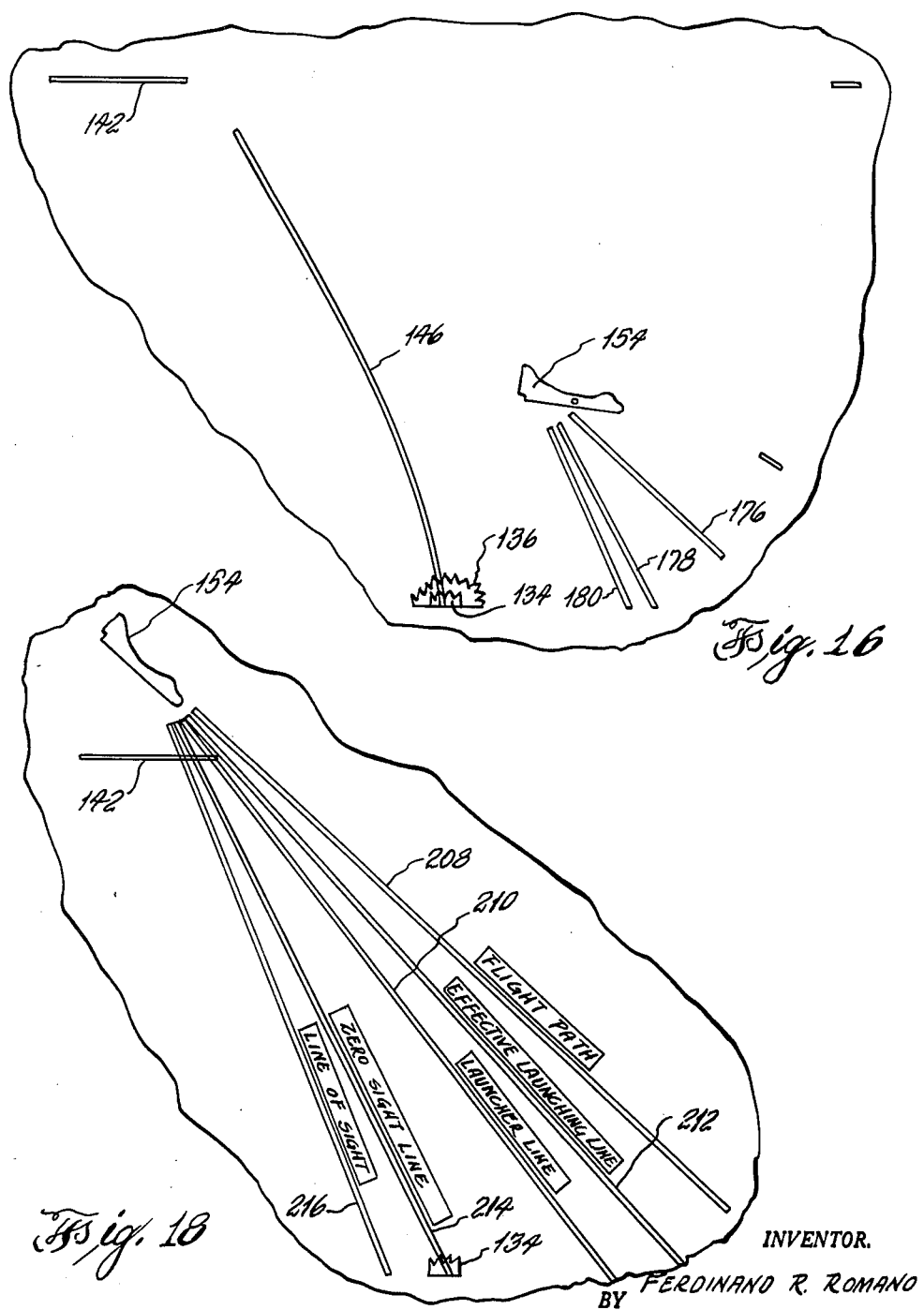

Sept. 7, 1965                F. R. ROMANO                3,204,342
            POLARIZED AND BI-REFRINGENT ANIMATED DISPLAY
Filed Jan. 24, 1962                            12 Sheets-Sheet 10

INVENTOR.
FERDINAND R. ROMANO
BY
Lawrence S. Epstein
ATTORNEY

Sept. 7, 1965 F. R. ROMANO 3,204,342
POLARIZED AND BI-REFRINGENT ANIMATED DISPLAY
Filed Jan. 24, 1962 12 Sheets-Sheet 11

INVENTOR.
FERDINAND R. ROMANO
BY
Lawrence S. Epstein
ATTORNEY

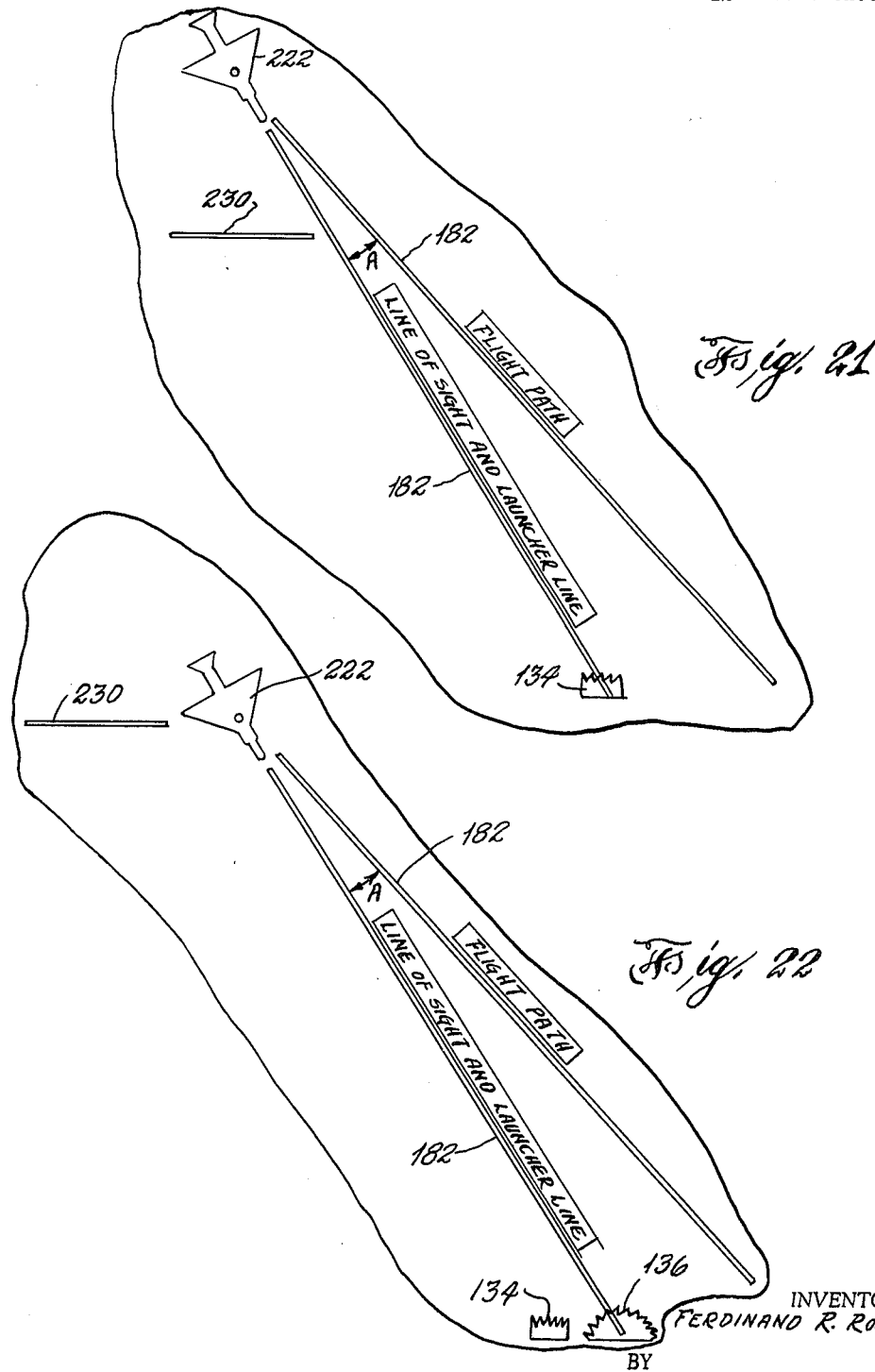

United States Patent Office 3,204,342
Patented Sept. 7, 1965

3,204,342
POLARIZED AND BI-REFRINGENT ANIMATED DISPLAY
Ferdinand R. Romano, Oceanside, N.Y., assignor to the United States of America as represented by the Secretary of the Navy
Filed Jan. 24, 1962, Ser. No. 168,561
10 Claims. (Cl. 35—25)
(Granted under Title 35, U.S. Code (1952), sec. 266)

The invention described herein may be manufactured and used by or for the Government of the United States of America for governmental purposes without the payment of any royalties thereon or therefor.

This invention relates to a projection for visual display of multi-color configurations which can be animated as desired while maintaining a constant opaque or black background. More particularly, the invention is to be used as a teaching aid to visually present to the students the physical concept of the factors involved in bombing and rocketry with their effects on aim.

The factors that are involved in learning bombing and rocketry are of such a nature that difficulty is experienced by the student in visualizing the physical concept of these factors and their effects on aiming. In classroom teaching, the instructure has always been forced to rely on model planes, together with the blackboard illustrations, to depict the problems and their solutions. These are ordinarily explained separately or simultaneously. However, instructors are not able to rapidly develop the free-hand illustrations used to sequentially develop the problem or to dramatize with sufficient accuracy and clarity the procedures followed in order to adequately depict the points necessary to enable the student to learn. To overcome these deficiencies in instruction, it was desirable to develop some sort of visual display which would be animated sufficiently to keep pace with the necessary motions involved in explaining these problems. After research, the device of the invention resulted. By means of this visual training technique, the operator may select any combination of lines or forms to be projected, while permitting him to manipulate these from outside the projection area. To obtain the desired effect, birefringent materials are used and are moved between a polarizer and an analyzer. Thus, it is now possible to teach military problems as well as other types of problems by means of visually demonstratable materials capable of selected movement for specific conditions.

While the description which follows will be related to problems in bombing and rocketry, it should be understood that the invention has wider application for any visual demonstration where the continuously changing positions of an object are to be illustrated.

It is the principal object of the instant invention to project visually multi-colored configurations that are capable of providing desired animation, while maintaining a constant opaque or black background for the projected image.

It is a feature of the invention to utilize bi-refrigent materials between a polarizer and an analyzer with axes set at right angles to each other.

It is another object of the instant invention to provide a demonstrator which will permit a single instructor to visually depict and explain the movements of an object to a number of students at the same time.

It is a further object of the invention to provide the equivalent of rapidly developed free-hand illustrations following the motion of an aircraft involved in aiming bombs or rockets during an attack.

Another object of the invention is to provide a plurality of various data lines such as those illustrating the flight path, the zero sight line, the line of sight, and others which are related to the center point of the plane and are movable in a range from zero to 90 degrees.

It is still a further object of the invention to visually illustrate factors that affect the point of impact with reference to the target in an aerial attack, such as trajectory drop, launch angle and the like.

A further object of the invention is to illustrate the dive angle, the slant range, the wind force and target motion, and the trajectory drop to realistically acquaint the student with the problems involved.

Other objects and many of the attendant advantages of this invention will be readily appreciated as the same becomes better understood by reference to the following detailed description when considered in connection with the accompanying drawings wherein:

FIG. 1 presents a perspective view of the device of the invention in its relation to an overhead projector and its projected image on a screen;

FIG. 2 is a plan view of the invention depicting a problem in bombing;

FIG. 4 illustrates the bomber leveling off;

FIG. 5 is a fragmentary plan view of the bomber being returned to its starting position;

FIG. 6 is a transverse section taken on line 6—6 of FIG. 2;

FIG. 7 is a vertical section taken along line 7—7 of FIG. 4;

FIG. 8 is a fragmentary section taken along line 8—8 of FIG. 2;

FIG. 9 is a fragmentary section taken along line 9—9 of FIG. 2;

FIG. 10 is a perspective view of one of the transparent bi-refringent elements;

FIG. 11 is a transverse section taken on line 11—11 of FIG. 10;

FIGS. 13, 14, 15 and 16 illustrate the progress of a bombing problem as seen on the screen;

Figure 19:
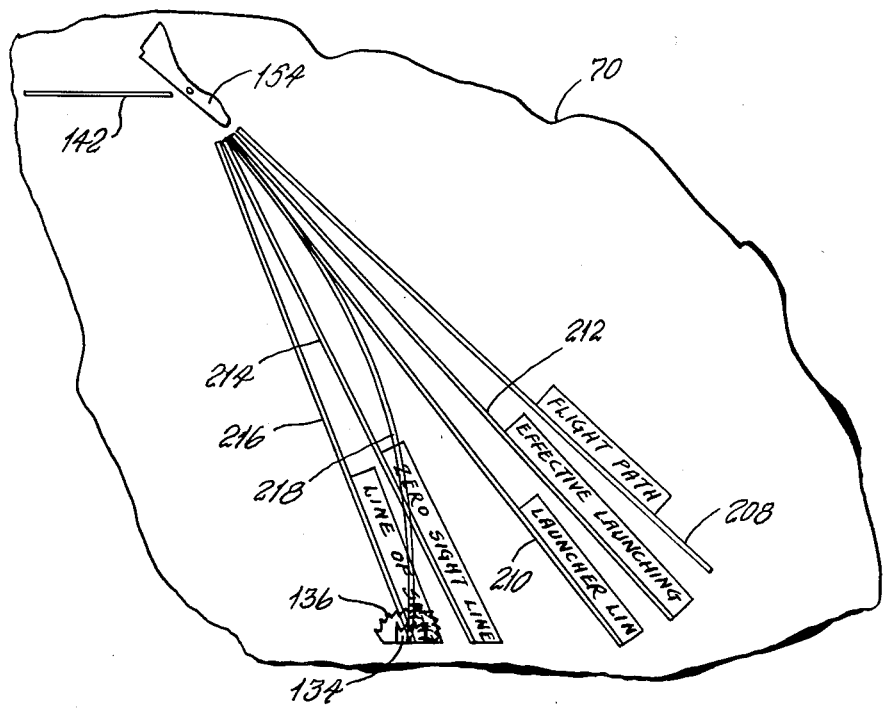
Figure 20:
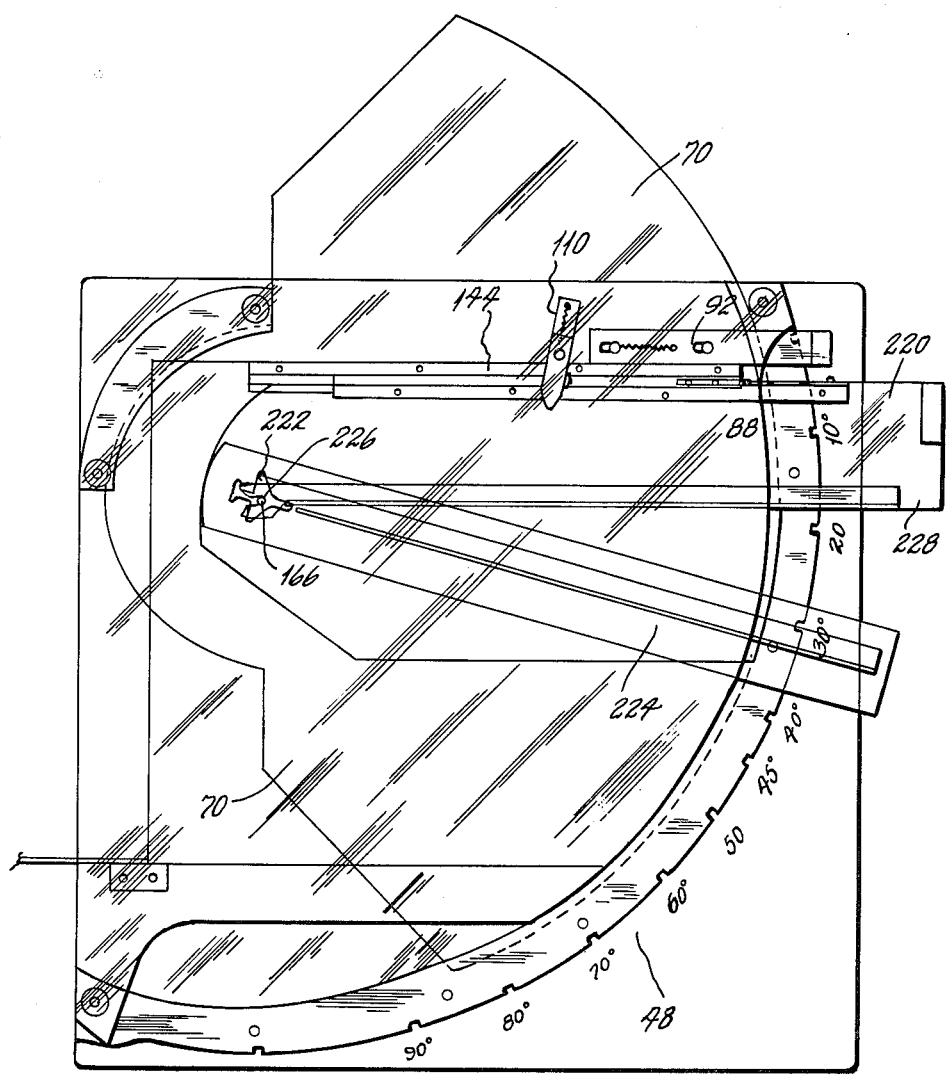

FIG. 17 schematically illustrates factors in rocket sighting;

FIGS. 18 and 19 illustrate a rocketry problem as seen on the screen;

FIG. 20 is a plan view of the invention and illustrating a wind drift problem; and FIGS. 21 and 22 illustrate the problem of FIG. 20 as visualized on the screen in a slightly modified manner.

Referring to the figures and particularly to FIGS. 1–16, the animated transparency device 30 is positioned on the table support 32 of an overhead projector. A source of light (not shown) is positioned in the projector below the transparency device 30 and reflects an image 34 on a screen 35 by means of suitable lenses contained in the head member 37 of the projector. Since the overhead projector forms no part of the invention, it need not further be described. By virtue of the construction of the animated transparency device 30, which will shortly be explained, only certain lines are visually observed on the screen 35. It should be understood that while the description of the construction and operation of the invention will be related to a bombing problem, this is only for purposes of illustration and other problems are equally capable of utilization within the scope of the invention.

Of the several types of bombing, the two most usually used are dive bombing and glide bombing. In the former instance, the bombing is undertaken from a high-angle dive, usually 60° to 70°, in which the plane is braked by flaps and/or wheels in order to maintain a constant median speed during the latter portion of the attack.

In glide bombing, however, the element of surprise is important and it is therefore a high speed maneuver where the angle of attack glide is normally from 30° to 55° without the use of dive brakes, flaps or other speed retarding devices. Both forms of bombing utilize the same principles. When executing a bombing exercise, many factors must be considered. These include aiming factors, the pull of gravity, the angle of the dive, the altitude of release of the bomb, the speed of the dive, the wind force as well as the target motion. Since the speed of the airplane increases during the dive it is not possible to merely point the plane straight at the target and expect to hit the bull's-eye, since the target will disappear under the nose of the aircraft. To compensate for this increase in speed, it is necessary to apply progressively larger forward stick pressures (decreasing the angle of attack) in order to maintain a straight line of flight to the target. This, of course, changes the point of aim. Factually, the pilot should initially aim short of the target, and bring the "pipper" up to the correct aiming point before reaching the release point. The trajectory of the bomb is affected by gravity, which tends to pull it straight down. Obviously, should the angle of dive be 90°, then all of the forces acting on the bomb are in a vertical plane, and the trajectory of the bomb is in a straight line from the point of release to the target. However, if the angle of dive is changed to approximately 60°, the flight path (or direction given to the bomb by the aircraft) differs from the vertical pull of gravity by 30°. The pull of gravity alters the trajectory and causes it to fall short of the point of aim. This fall or drop behind the line of flight is known as the "trail." To prevent the bombs from falling short of the intended point of impact, this "trail must be allowed for by the pilot. The altitude of release also affects the accuracy of aim as well as the speed of dive of the aircraft. A bomb will adhere to the flight path on which it started and the extent depends upon the speed of the aircraft. If a plane were at a 60° angle and was standing absolutely still, the bomb when released would fall vertically. But since the airplane is moving forward, the bomb, upon release from the aircraft, would continue for some distance along the 60° line before the gravitational pull would cause it to deviate from this flight path. Wind upon the aircraft has an effect on the aim of the bomb as well as the motion of the target itself.

Figure 12:
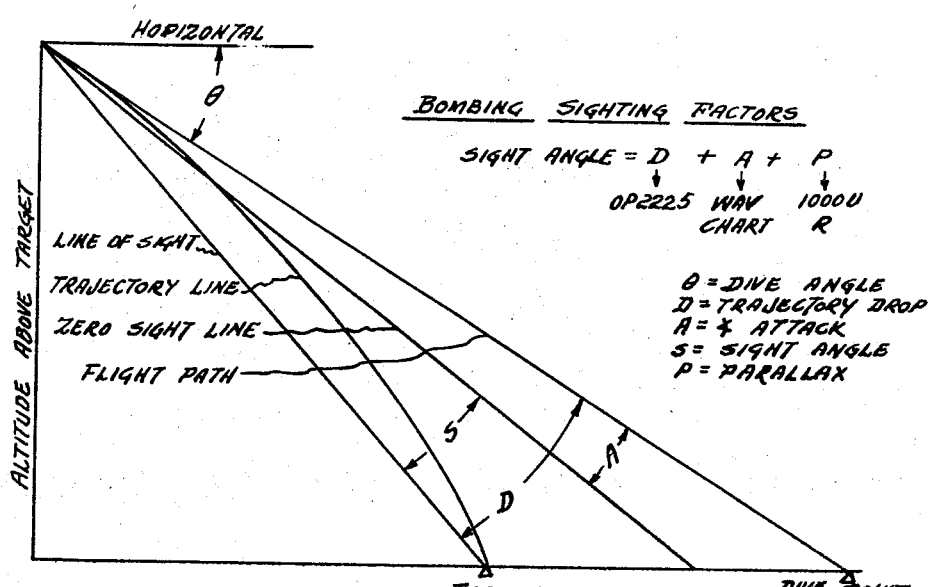
FIG. 12 is a schematic illustration of factors involved in bombing and sighting.

FIG. 12 illustrates schematically the bombing sighting factors. The sight angle is determined by the trajectory drop plus the angle of attack and the parallax. For purpose of illustrating the problem in the other figures, the parallax effect will be omitted. The dive angle of the aircraft is illustrated by theta in its relation to the horizontal, with the trajectory line illustrating the trajectory curve between the point of release and the target.

The device of the invention which permits a visual projection of a bombing maneuver is illustrated in detail in FIGS. 2 through 11. This is obtained through the use of a quadrant providing for any angle of bombing from between zero and 90°. In explaining the problem, the instructor, by use of appropriate indicators, illustrates the factors involved as is illustrated schematically in FIG. 12. The entire effect is obtained by maintaining a constant opaque or black background on the screen 35. A plurality of guide strips and the aircraft are solely visible on the screen. Manipulation of these elements are from beyond the projection area to avoid interference with the projected image. Any number of colors may be utilized. It should be noted that the components to be projected are made of bi-refringent materials which are moved through a polarizer and an analyzer with their axes set at right angles to each other.

Figure 1:
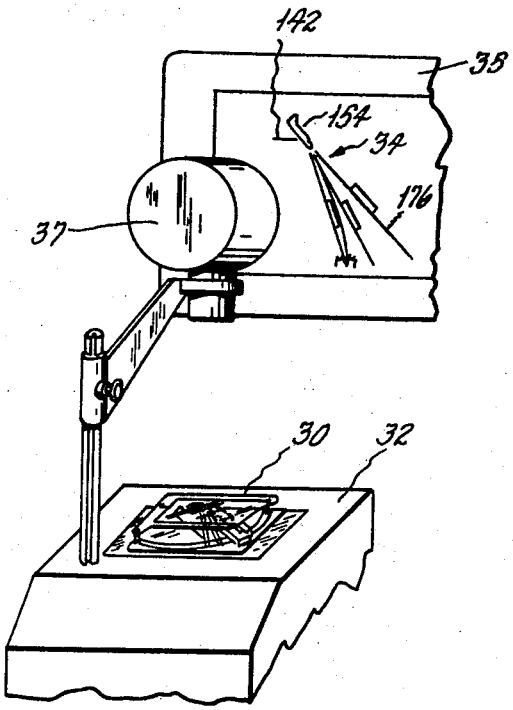

The animated transparency 30 comprises a base plate 36 and a spaced apart parallel plate 38, adapted to retain the polarized materials 40 and 42, respectively (see FIG. 6). It is a known principle of polarization that a polarized material serves to transmit all of the waves of a beam of light in the same plane as its transmission axis and absorbs all of the waves of a beam of light that are in a plane perpendicular to this axis. Thus, when two individual polarized materials are positioned at right angles to each other, together they serve to absorb all of the transmitted waves of light so that none come through. When this is done, a completely dark or black area is obtained. The polarized sheet of material 40 is carefully sandwiched between the plate members 36a and 36b of the base plate 36 while the second sheet of polarized material 42 is sandwiched between the plate numbers 38a and 38b of the parallel base plate 38 and is identified as the analyzer material. The polarized analyzer sheet 42 is at 90° in relation to the polarized sheet 40, thereby preventing any light from being transmitted through the plate members when positioned for screen viewing, as shown in FIG. 1. The vertical posts 44 retain the plate members 36 and 38 in the desired spaced apart position, as is illustrated in the figures. The remaining areas of the clear plastic plate members 36 and 38 may be painted over or otherwise rendered opaque so that any desired information may be printed thereon without being exposed to view of the screen 35. Thus, the area 46 on the parallel plate member 38 may be utilized for any such desired notation (see FIG. 4). In a like manner the base plate 36 is utilized to mark the angles of the quadrant as is illustrated at 48 (see FIGS. 2 and 20). The quadrant plate 70 forms a quarter of a circle and is constructed of any desired opaque material. In the instant device the material utilized for element 50 is stainless steel or aluminum and is immovably secured on the base plate 36 by means of the fastening screws 52. A plurality of notches 54 on the arcuate quadrant 50 indicate the several degrees whereby the angle of dive of the airplane may be selected (see FIG. 2). The arcuate quadrant 50 is provided with the extended lip members 56 and 58 so that an arcuate track 60 is obtained therebetween. An arcuate sector 62 contains the extended lip members 64 and 66 in spaced apart, opposed relationship to ahe arcuate quadrant 50 so that the track portion 68 receives, together with the track portion 60, the slidable quadrant plate 70 (see FIG. 6). The quadrant plate 70 is of clear plastic material and is adapted to be arcuately moved in the track members to adjust for any angle of dive for the problem to be illustrated (see FIGS. 6 and 7). The outer perimeter of the quadrant plate 70 is beveled slightly at 72 so that a continuous surface may be provided with respect to the members 50 and 62. This serves to prevent accidental jamming of the movable elements when a bombing problem is illustrated.

Figure 3:
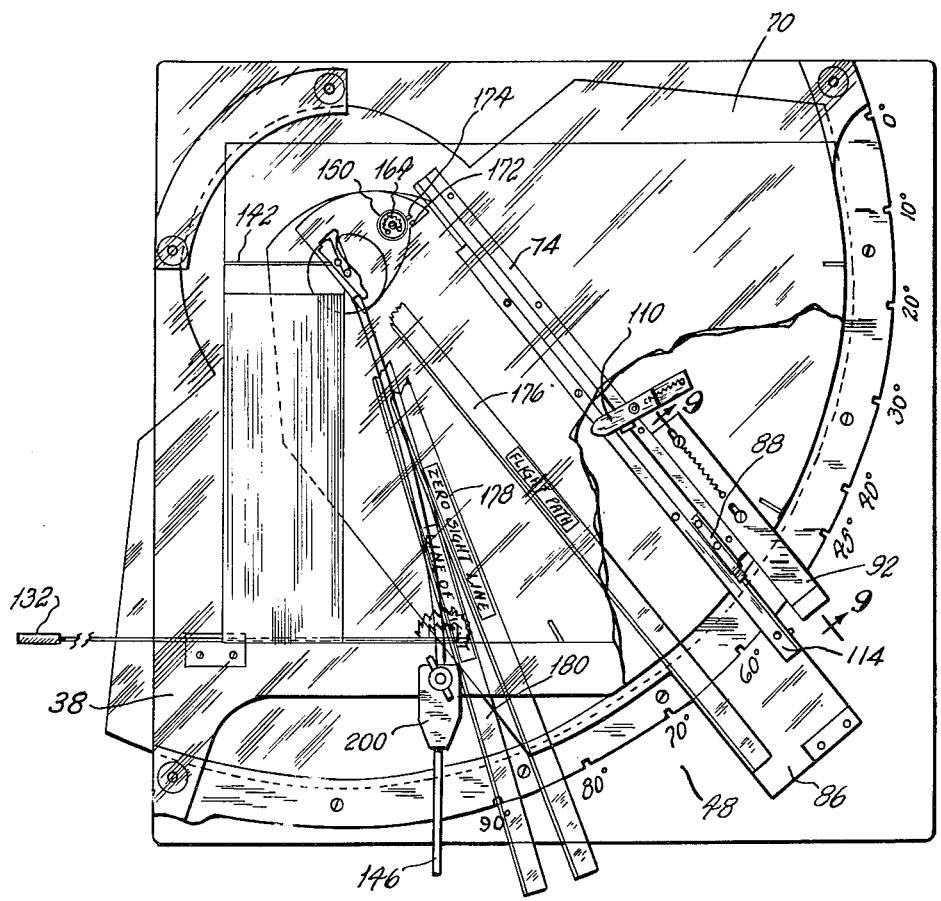
FIG. 3 is similar to FIG. 2 with the bomb at the point of release.
Figure 12:
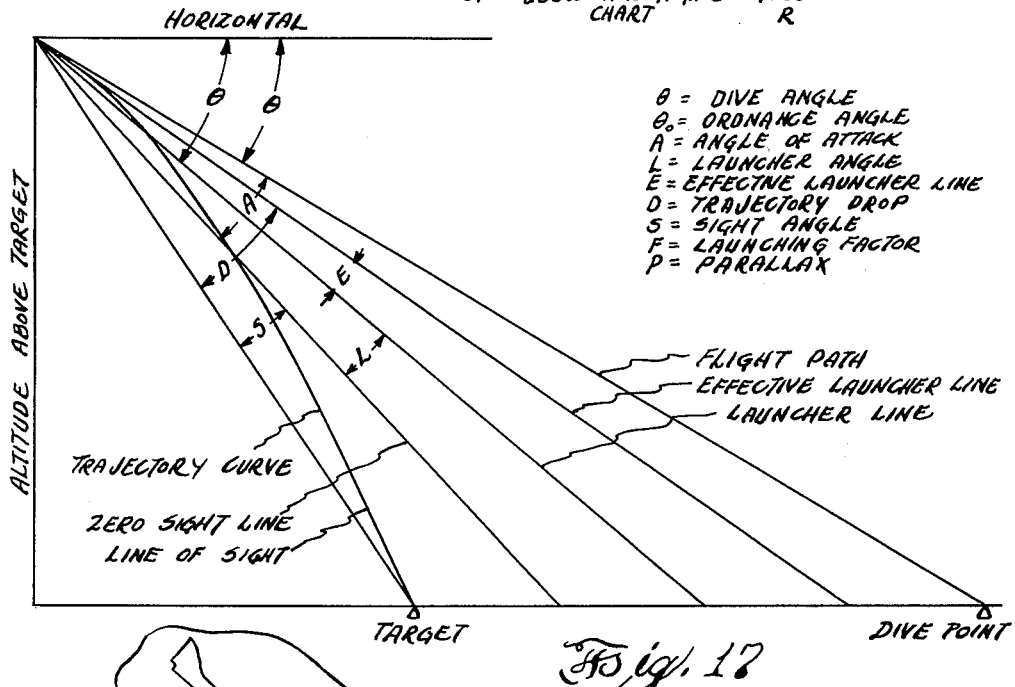
Figure 13:
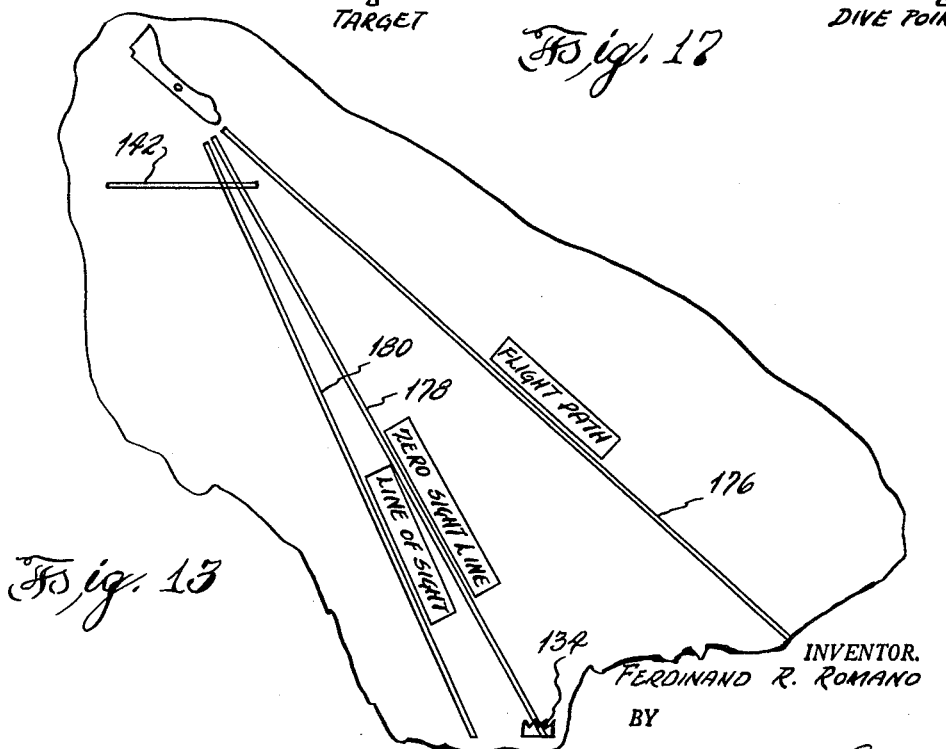

As is clearly illustrated in FIG. 6, the vertical track member 74 is secured to the quadrant plate 70 at 76. A spacer strip 78 is positioned between the plate 70 and the vertical track member 74. The track member 74 includes a right angled transverse flange 80, terminating in a depending lip 82. Thus, the lip 82 and the track 74 provide the space or channel 84 in which the problem slide mover 86 is adapted to be slidably received. As is clearly show in the figures, the vertical track member 74 is positioned transversely across the quadrant plate 70 and overlies the black area obtained by means of the polarized material, as was described above. As is illustrated in FIGS. 2 through 4, a leaf spring 88 is positioned on one end of the track member 74 and is provided with a resilient lip portion 90 which depends downwardly and overlies the channel section 84 of the vertical track member (see FIG. 6). The leaf spring serves to aid in resiliently maintaining the slide member 86 within the track when in use. The resilient tip also serves to function as a stop member, as will presently appear.

The latching member 92 is illustrated in the figures and particularly in FIG. 9 and is secured at 94 to the quadrant plate 70 and comprises a bar member 96 terminating in an actuating button or knob 98. The lost motion slots 100 are provided on the bar member 96 and receive the fastening bolts 94 therethrough. The tension spring 102 is secured at one end to one of the bolts 94 and is anchored at 104 on the bar member 96. The locking pin 106 extends from the outer edge of the bar member 96, beyond the outer periphery of the arcuate quadrant 50 and is adapted to be received in the notched areas 54 of the quadrant. Thus, when the slide member 86 is to be slidably adjusted on the quadrant to a specific angle of dive or glide bombing, the latching member 92 is slidably removed from the notch 54 by actuation of the button 98 against the force of the spring 102. The bar member 96 is retracted to free the locking pin 106. The slide member is then moved until the desired angle on the quadrant is reached and the locking pin 106 is received in the respective notch 54 to lock the slide member in position.

The cam actuator 108 is illustrated in detail in FIG. 8 and it is shown in operative relationship in the other figures. The cam actuator 108 is positioned on the slide mover 86 at a preselected point and one where the bomber is just coming out of its dive. This operation will be more fully described shortly. The cam actuator 108 includes a cam finger member 110 pivotally mounted by means of the pivot pin 112 on the extension flange 114 extending from the vertical support 116. The support 116 is fixedly retained on the slide mover 86. The cam finger 110 contains a rearwardly extending portion adapted to anchor at 118 one end of the compression spring 120 the other end of said spring being secured to the vertical support 116 at 122. The stop means 124, extending above the side of the extension plate 114 permits the cam finger 110 to pivot in one direction only.

As can be seen in FIGS. 2 through 4, the upper or parallel base plate member 38 is provided with a dependent block member 126, secured at 128 to the lower free surface thereof and containing elongated bores to receive and retain in slidable relation the target and hit indicating means 130. While only one of these elements is shown in the plan view of the figures, they are in fact separate target indicating means as well as hit indicating means. These members are slidably actuated through the block support means 126 and are designed to be grasped at the knurled finger ends 132 to project either the target 134 or the bomb burst 136, or both on the screen. (See FIG. 4.) It should be noted that the means to operate the visual portion of the target or the bomb burst, namely the stem portion 130, is entirely exterior of the part projected on the screen. A depending hanger pin 138 (see FIGS. 4 and 7) extends through the parallel base plate 38 and depends toward the base plate 36 at a point substantially where the bomb would be released. The hanger pin 138 is designed to receive the trajectory strip 140 (FIG. 4) for a purpose soon to be explained. The trajectory strip 140 is generally similar in construction to the strip shown in FIGS. 10–11, except that it is not as wide.

As is illustrated in FIGS. 2–4, a short, transverse, clear thin line is provided at 142 on the polarized portion of the base place 36. This is intended to designate the height at which the bomb would normally be released by the airplane. Thus, when the bombing problem is projected upon the screen 35, the line 142 is not affected by the polarized technique employed and shows up on the screen by permitting light to travel through it.

The slide member 86 is utilized to depict the bombing operation and is constructed primarily of clear acrylic plastic and is adapted to slide in the vertical track member 74 by means of the L-shaped rail 144. The horizontal leg of the rail 144 is secured to the plastic side mover, with the vertical rail at a longitudinal edge thereof. A guide strip edge 146 is provided as well as an actuating button 148. The vertical support post 150 retains the cam shaped member 152 in a pivotal arrangement, as will presently be explained. An imitation of a bombing plane 154 is positioned on the cam member 152 and is constructed of a bi-refringent material. A tension spring 156 is anchored at 158 to a recess 160 on the upper free surface of the support post member 150 and is secured to the cam member 152 at 162 (see FIG. 4). The pivot bolt 164 serves the dual function of retaining the cam member for free movement while securing the post 150 to the slide 86. The vertical retaining pin 166 is secured to the slide member 86 at a point approximately adjacent the position assumed by the bomber 154 at the point of bomb release (see FIG. 6). It should be noted that this is generally adjacent the clear strip 142. A number of indicia strip members, one of which is depicted at 168 in FIGS. 10 and 11, are intended to be positioned on the vertical retaining pin 166 during the time that the instructor is developing the bombing problem for the class.

Further, the vertical leg of the L-rail 144 is provided with the detent 170 at a point along its length approximating the position of the bomber 154 at the point of bomb release (see FIG. 4). Thus, when the instructor moves the slide 86 to the position of glide or dive when it is time to release the bomb on the target below, the detent serves to hold the slide member 86 at the correct point of release. The resilient tip 90 of the leaf spring 88 seats in the detent 170 to carry out this function. A stronger pressure on the slide member 86 will cause the spring tip 90 to lift from the detent to release the slide member for continued movement. The instructor then continues to explain while visual observation occurs simultaneously. The stop pin 172 serves to stop further movement of the cam member 152 when the extension means 174 extending from the vertical support post 150 engages it (see FIG. 3). This serves to position the simulated bombing plane 154 in a vertical, dive or glide position. A number of transparent, plastic guide strips are utilized in the classroom, of which a number are illustrated at 176, 178 and 180. One of these is disclosed in detail in FIGS. 10–11, and it is understood that all of these are generally of the same construction. These strips are utilized to visually depict the problems encountered by the student in his bombing mission. The indicia guide strip 176, for example, is of clear plastic, such as Lucite, and is ordinarily not visible to the eye when in the position illustrated in FIGS. 2–3 on the screen. One edge thereof is provided with an elongated layer of bi-fringent material 182 which is cemented at 184 to the guide strip 176. In addition, any desired legend may be provided on the transparent guide strip 176, as is illustrated at 186. This lettering is made visible, as is the line 182 on the overhead screen by provision of a bi-refringent material at 188. The polarization of light by absorption is one means of directing the transverse waves of light. This technique was utilized with the polarized material 40 and 42. In this method, the light waves transmitted were in one direction while the light waves in the other direction were absorbed. By placing two sheets of this material at right angles to each other, the light waves permitted to travel through the first sheet are absorbed by the second sheet and therefore no light escapes. In a like manner light waves traveling through the second sheet are absorbed by the first sheet. This provides the dark background projected on the screen and nothing between them is visible. In order to be able to display objects or images on the screen 35, these materials are covered with bi-refringent material. Light does not traverse this material with equal velocity in all directions, the material not being isotropic. When this bi-refringent medium is placed between a polarizer and an analyzer at a 45° angle, the incident plane polarized light is split into two plane polarized components that are out of phase. The analyzer reassembles part of each component into a single plane polarized beam. This resulting image on the screen is a bright area wherever the bi-refringent material is interposed between the polarizer and the analyzer. A double layer of bi-refringent material is used to permit movement through 90° rotation, and still have images as bright areas.

The guide strip 176 is enlarged at 190 and contains the positioning slot 192. When the guide strips are to be used, they are pressed firmly into position on the vertical retaining pin 166, in the manner clearly shown in FIG. 6. The shim 194 is positioned around the slot 192 to serve as a spacer means when a plurality of the guide strips are utilized.

The utilization of the animated transparency will be described in conjunction with its visual projection onto the screen 35. FIGS. 1–5 illustrate in plan view the steps of a bombing operation while FIGS. 13–16 depict the visual results on the screen. The device of the invention is positioned on the platform 32 of the overhead projector and is illuminated by means of a light positioned blow. The projector 37 then projects the transparency device 30 onto the screen 35. At this point, a completely dark background is shown because of the polarized material 40 and 42 being positioned in the base plate 36 and in the parallel plate 38, respectively. The slide mover 86, mounting the cam member 152 is slid along the vertical track 74 by virtue of the vertical leg of the L-rail 144 being slidably retained within the channel 84. The cam member 152 contains the simulation of a bombing plane 154 and is composed of bi-refringent material. Scraping action of the slide mover 86 is avoided because of the spacer strip 78. As is shown in FIG. 5 and FIG. 3 the cam member 152 engages the cam finger 110, causing the latter to move rearwardly and away from the stop means 172. Once the cam member 152 has passed this position, the cam finger 110 returns to its normal position illustrated in the other figures against the stop 172. This is the reverse of the forward motion of the slide mover 86, wherein the cam pivots while the cam finger remains stationary. The problem slide mover 86 continues in this direction until the transverse pin 196 abuts the free end of the L-shaped rail member 144, as is clearly illustrated in FIG. 2.

At this position the aircraft 154 is at some point above the height of bomb release. The angle of the flight path of the aircraft for attack is then selected by the instructor. If he desires to illustrate a dive bombing attack, he would select an angle between 60° to 70°. Or, if he wishes to dipict a glide bombing attack, the angle of attack glide is normally from 30° to 55°. For the purpose of illustration, a glide bombing attack is illustrated at a dive angle of 50°. To achieve this, the latching member 92 is urged against the spring 102 until the locking pin 106 is free of the notch 54 of the quadrant member 50. While holding the latching member in this position, the quadrant plate 70 is rotated until the locking pin 106 is opposite the notch 54 which corresponds to the 50° angle, as is marked on the base plate member 36. The slide mover 86 is then locked in this position. As the plane follows a particular flight pattern, the guide strip member 176 containing the legend "flight path," is secured to the vertical retaining pin 166 as was described previously. The bi-refringent edge 182 (see FIG. 10) is positioned parallel to and overlying the guide strip edge 148, as is visible in the figures. This will then provide an attack angle of 50°. The bi-refringent strip 182 is on a colored plastic material and this color shows up on the screen 35. Thus, at this point only the airplane 154 and the slender line of flight path at 182 are visible on the overhead projector (see FIGS. 2 and 10). At this point the pilot sights his target 134, while in the position above the point of bomb release. To visually illustrate this, the instructor would then insert the second guide strip 178, labelled "Zero sight line." A guide line similar to that illustrated at 182 in FIG. 10 is provided the guide strip 178, and may be of a color different from that utilized for the strip 176. The guide strip 178 is also positioned on the pin 166 with the edge 182 overlying the target 134, as is shown in FIG. 2. However, unless the pilot is diving vertically at a 90° angle, the "Zero sight line" is not the actual line of sight for the moment at which he will release the bomb at the target. The pilot must take his airplane motion into consideration and with it provide a lead angle. This is done by means of tables available to him, or by past experience. The plastic guide strip 180 and labelled "Line of sight" is then inserted between the two polarized plates on the vertical pin 166. At this point it is positioned generally adjacent the "Zero sight line." What is now visible on the overhead screen of FIG. 1 is illustrated in FIG. 18 schematically. All the students will see projected onto the screen in the flight path of the airplane with the "Zero line of sight" and the trailing edge of the "Line of sight." The transverse line 142 is also visible and depicts the point of release for the bomb.

In FIG. 3, the instructor has moved the slide member 86 to the position of bomb release. At this point, the resilient tip 90 of the latching member 92 is seated in the detent 170 and the cam member 152 containing the aircraft 154 is adjacent the line 142 and the pin 138. At this point, the "Line of sight" guide strip 180 overlies the target 134. This is schematically shown in FIG. 14. This is a visual picturization of conditions occurring for a standard glide at 50°. The speed of the aircraft is a factor as well as the point of release of the bomb. Thus, if it is presumed that the aircraft has a ground speed of 200 knots with the release point at 2,000 feet, the total "trail" is bound to be 257 feet. The point of aim for the pilot or bombardier therefore must be 257 feet beyond the target, in order to obtain a hit. This, of course, will not take into consideration any motion of the target itself. The student now visually can see for the first time the requirement for this procedure. Further, when a bomb is dropped and since the aircraft is moving at a high rate of speed, the bomb will travel in the direction of the aircraft initially, before the pull of gravity tends to move it downwardly. This phenomenon is also pictured by means of the trajectory strip 140.

The trajectory strip differs from the guide strips in that it is a narrow strip of colored plastic with the bi-refringent material around it. To illustrate this trajectory, the edge of the quadrant or parallel plate 38 is used. The slotted end of trajectory strip 140 is positioned on the hanger pin 138 above the slide mover 86 and out of contact therewith. The flexible plastic material is then bowed as is illustrated in the figures so that it overlays the target 134 (see FIG. 4). The wing clamp 200 is secured to the upper parallel plate 38 by means of the rotation of the wing nut 202 on the clamping screw 204. The lower portion of the C-clamp 200 is provided with a longitudinal bore 206, through which the trajectory strip 140 extends. (See FIG. 7.) The arcuate path of the trajectory strip is illustrated schematically in FIG. 15 as well as in FIG. 12. It should be noted that the trajectory line portion adjacent the aircraft is somewhat in the direction of travel of the aircraft with the pull of gravity illustrated in the lower portion thereof and overlying the target 134.

The instructor explains at this point that the bomb has been dropped and that the plane has completed its downward path and is ready to pull out of its glide. This is depicted in FIGS. 4 and 16. At this moment, the instructor has moved the slide member 86 forwardly until the cam 152 engages the cam finger 110. The cam member 152 pivots about the post 150 to rotate the airplane 154 into the horizontal position assumed by an actual aircraft when it is pulling up out of its dive. By this time, the target has been left behind and the hit illustrated by the bomb burst 136 is clearly visible on the overhead screen. The bomb trajectory stands out for the student. It should be noted that elements 134 and 136 are also of bi-refringent materials. The instructor is able to expand on this visual presentation by further oral discussion, as desired.

The device of the invention is also adaptable for instruction and training rocketry. FIGS. 17–19 illustrate the application of the overhead visual technique to a problem in shooting rockets from the air.

The inventive concept may be utilized in other forms of training, such as in rocketry. The rocket sighting factors involved are graphically disclosed in FIG. 17, while FIGS. 18–19 pictorially represent the operation of a plane by its projection on the overhead screen.

It is extremely important that the pilot have a thorough knowledge of the computation of rocketry sighting angles in order to insure his firing accuracy. Referring to FIG. 17, the armament data line is represented by the rack which holds the rocket and is a longitudinal reference line fixed relative to the aircraft. This line represents a line parallel to the flight line at maximum velocity, at critical altitude, with one-half the fuel load, with a full load of ammunition and without the bomb load when in level flight. The zero sight line is normally foresighted parallel thereto and is set at zero. The line of sight represents the line from the eye to the hitting point. For a zero sight angle this line would appear through the "pipper" of the gunsight, otherwise through a point in the reticle above (or below) the pipper by the amount of the sight angle. The flight path is the angle at which the aircraft is moving with respect to the air. The angle of attack is the angle between the flight path and the zero sight line (armament datum line). Also, the angle between the launcher line, and the armament datum line is the launcher angle, while the launcher line represents longitudinal axis of the rocket when attached to the launcher. The launcher line is the initial movement or jump of the rocket at launch, as the fins (under the first impact of the airflow) turn the rocket into the line of flight. The effective launcher line represents the component force of the line of flight and the launcher line, due to rocket motor power. Thus, the trajectory curve is shown initially as moving along the effective launcher line path until the force of gravity curves it downwardly towards the target. The sight angle S is the angle between the zero line of sight and the line of sight at the instant of firing and release. This represents the lead for the pilot. Figures to compute the sight angle are knowledgable to the pilot, and will not be further described here.

The instructor proceeds to show that the airplane carrying the rockets 154 is positioned above the release point indicated by the line 142, as in the previous problem. The flight path line 208 is provided at the angle of dive of the aircraft. Then the guide strip 210, representing the launcher line, is inserted on the retaining pin 166 to indicate the longitudinal axis of the rocket. The effective launching line 212 is provided between the flight path 208 and the launcher line 210 to represent the initial movement of the rocket when released. The zero sight line 214 is sighted over the target 134 and, when the lead is figured, is visually represented by the line of sight 216. The aircraft 154 is moved through the rocket release position, as is shown in FIG. 19, and at this point the line of sight and the target are in line. The trajectory angle 218 is provided in the manner described for the bomb diving, and it should be noted that the portion of the line adjacent the aircraft travels a short distance along the effective launcher line to represent the initial direction of flight of the rocket, while the lower portion illustrates the change in flight path occasioned by the pull of gravity. Thus, the additional factor involving the launching of a rocket is visually demonstrated to the student, while the instructor describes the problem.

The allowance usually utilized for parallax, which corrects the sight angle to compensate the fact that the gunsight is above the rocket launcher is negligible and therefore was not included in the demonstration. Further, the effect of drift was not shown in this view. However, this may be readily illustrated by the instructor, and is shown in FIGS. 20–22. The problem of drift is the same of course, for bombing or rocketry. When an aircraft is headed directly into or downwind, it will stay on its course without further compensation. However, where the wind is somewhere to the side, the course made by the aircraft is not that in the direction of its heading, but is a resultant of the plane's course and the speed of the wind. The angle thus formed between the heading of the plane in the air and its direction of movement over the earth is called "drift angle." It should be noted that FIG. 20 is a plan view of the aircraft flying horizontally, while in the diagrammatic view shown in FIGS. 21–22, a dive angle of approximately 45° is illustrated.

The slide mover 220 is generally similar to the problem slide mover 86 except that the plan view of the airplane 222 is made of bi-refringent material and is attached to the transparent strip 224. A suitable aperture 226 is provided in the transparent strip where the plan view of the airplane 222 is visible. The strip 224 is thus pivotally mounted on the vertical retaining pin 166 for adjustment for purposes of instruction and illustration.

If the effect of drift is to be illustrated, the instructor will adjust the quadrant plate 70 to the desired flight angle. The guide strip 176, containing the bi-refringent line 182 is positioned parallel with the edge 228 of the slide mover 220. The "Line of sight" guide strip 180 is then attached to the vertical retaining pin 166 in the manner previously described with the bi-refringent edge visible on the screen. Beneath the "Line of sight" guide strip member would be the other guide strips used such as the launcher line, zero line of sight, etc. These would not be visible on the overhead screen since they are in a stacked layer. The line of sight guide strip should of course lead the target 134. As is apparent from FIG. 21, the aircraft 222 is at a position above the point of release 230. Obviously should the pilot adjust his line of sight on the target at this point. When he released the bomb during the dive, he would score a miss. This condition is carried out in FIG. 22, where the aircraft 22 has just released the bomb, and has missed the target at 136. This problem is illustrated as was indicated with respect to FIGS. 1–11 in the manipulation of the structure, an interesting point to be observed by the student is that he will see that the aircraft travels along the flight path guide strip even though it appears to be heading in the direction of the line of sight. The effect of wind is thus graphically illustrated.

It should be evident from the above description and illustration, that the instant invention is capable of wide application within its scope. The projected image presents the selected vertical lines and the aircraft outline in selected colors on a black background. This is made possible by utilizing, for all the components to be projected, an acrylic plastic with a layer or layers of bi-refringent materials arranged at right angles to each other. The dark background is provided by a utilization of two polarizers with their axes set at right angles to each other and by placing the by-refringent parts inbetween. Instructors no longer are constrained to teach the subject of bombing and rocketry aiming with the use of static transparencies and charts. This training aid thereby facilitates the learning means for the student.

Obviously many modifications and variations of the present invention are possible in the light of the above teachings. It is therefore to be understood that within the scope of the appended claims the invention may be practiced otherwise than as specifically described.

What is claimed is:

1. A device for visually demonstrating a subject on an overhead projector comprising a screen, a polarized material, an analyzer material positioned at substantially right angles with respect to said polarized material, whereby a dark background is provided through the absorption of light, means positioning said materials in spaced apart relation, an adjustable quadrant plate secured to said polarized material, a track member mounted on said quadrant plate, a problem slide mover movably retained in said track member, a cam member mounted on said problem slide mover and movable therewith, said cam member including a bi-refringent area depicting an object, a cam actuator secured to said quadrant plate and overlying said problem slide mover and a plurality of bi-refringent guide strip means positioned between said polarizer and analyzer whereby the factors involved in operation of the subject problem are illustrated.

2. The combination of claim 1 wherein said track member includes a channel section, said problem slide mover being retained in said channel section for planar movement.

3. The combination of claim 2 and including spring means positioned at one end of said track member and engaging said slide mover, said spring means serving the dual function of a resilient retaining means and stop member.

4. A device for visually demonstrating a subject on an overhead projector comprising a screen, a polarized material, an analyzer material positioned at substantially right angles with respect to said polarized material, whereby a dark background is provided through the absorption of light, means positioning said materials in spaced apart relation, an adjustable quadrant plate secured to said polarized material, a track member mounted on said quadrant plate, a problem slide mover movably retained in said track member, a cam member mounted on said problem slide mover and movable therewith, said cam member including a bi-refringent area depicting an object, a cam actuator secured to said quadrant plate and overlying said problem slide mover, and a plurality of bi-refringent guide strip means positioned between said polarizer and analyzer whereby the factors involved in operation of the subject problem are illustrated, an arcuate quadrant secured to said polarized material, having notch means therein said arcuate quadrant to depict specific angles in the arcuate quadrant and a latching member secured on said quadrant plate, said latching member including a locking pin adjacent one end thereof, said locking pin being removably received in said notch means and tension means on said latching member retaining said locking pin in a selected notch of the arcuate quadrant.

5. The combination of claim 4 and including block means depending from said analyzer member having bore means extending through said block means and problem indicating elements extending slidably therethrough.

6. In combination with an overhead projector and a screen; an animated transparency device constructed to illustrate a bombing problem on the screen comprising, a base plate containing a polarizer material, a parallel plate containing an analyzer material, said plates including means mounting them in spaced apart relation, and the axes of said material being at right angles to each other to provide an opaque background through the absorption of light waves, a quadrant plate member retained adjustably between said first named plates, slide means slidably retained on said quadrant plate member, said slide means containing a bi-refringent material depicting the bomber, said bi-refringent material being capable of being visible on the screen through the opaque background whereby the movement of the bomber is followed, and guide strip means secured on said quadrant plate, said guide strip means including a bi-refringent edge, whereby various factors involved in the bombing problem are visibly depicted on the screen.

7. The combination of claim 6, wherein a track member is mounted on said quadrant plate and channel means extending from said track member, said slide means being slidably received in said channel means.

8. The combination of claim 7, wherein quadrant means are mounted on said base plate, notch means in said quadrant means, latching means secured to said quadrant plate and a locking pin depending from said latching means and seated in said notch means, whereby the problem slide mover is retained in an adjusted angle of bombing attack.

9. In combination with an overhead projector and a screen; an animated transparency device constructed to illustrate a rocketry problem on the screen comprising, a base plate containing a polarizer material, a parallel plate containing an analyzer material, said plates including means mounting them in spaced apart relation, and the axes of said material being at right angles to each other to provide an opaque background through the absorption of light waves, a quadrant plate member retained adjustable between said first named plates, slide means slidably retained on said quadrant plate member, said slide means containing a bi-refringent material depicting the rocket, said bi-refringent material being capable of being visible on the screen through the opaque background whereby the movement of the rocket is followed, guide strip means secured on said quadrant plate, said guide strip means including a bi-refringent edge, whereby various factors involved in the rocketry problem are visibly depicted on the screen, wherein one of said guide strip means includes launcher line indicia to represent the initial movement of the rocket at launch and another of said guide strip means includes effective launcher line indicia.

10. The combination of claim 9, wherein quadrant means are mounted on said base plate, notch means in said quadrant means, latching means secured to said quadrant plate and a locking pin depending from said latching means and seated in said notch means, whereby the problem slide mover is retained in an adjusted angle of rocketry attack.

References Cited by the Examiner
UNITED STATES PATENTS

| | | | |
|---|---|---|---|
| 2,511,010 | 6/50 | Rohr | 88—65 |
| 2,929,156 | 3/60 | Reddy | 35—25 X |
| 2,958,957 | 11/60 | Domeshek | 35—25 |
| 3,104,273 | 9/63 | Ballance | 88—65 |

EUGENE R. CAPOZIO, *Primary Examiner.*

LEO SMILOW, LAWRENCE CHARLES, JEROME SCHNALL, *Examiners.*